United States Patent
Knobloch et al.

(10) Patent No.: US 6,954,309 B2
(45) Date of Patent: Oct. 11, 2005

(54) OPTICAL COMPONENT

(75) Inventors: Pascal Knobloch, Braunschweig (DE); Dimitry Turchinovich, Braunschweig (DE); Thomas Dobbertin, Braunschweig (DE); Martin Koch, Braunschweig (DE)

(73) Assignee: Technische Universität Braunschweig Carolo-Wilhelmina, Braunschweig (DE)

( * ) Notice: Subject to any disclaimer, the term of this patent is extended or adjusted under 35 U.S.C. 154(b) by 62 days.

(21) Appl. No.: 10/332,372

(22) PCT Filed: Jul. 10, 2001

(86) PCT No.: PCT/DE01/02492
§ 371 (c)(1),
(2), (4) Date: Sep. 12, 2003

(87) PCT Pub. No.: WO02/05291
PCT Pub. Date: Jan. 17, 2002

(65) Prior Publication Data
US 2004/0075923 A1 Apr. 22, 2004

(30) Foreign Application Priority Data
Jul. 10, 2000 (DE) ........................................ 100 33 259

(51) Int. Cl.$^7$ ............................................... G02B 1/10
(52) U.S. Cl. ...................... 359/586; 359/359; 359/584; 359/588; 359/589
(58) Field of Search ................................ 359/586, 584, 359/588–589, 359

(56) References Cited

U.S. PATENT DOCUMENTS

| 3,551,017 A | * 12/1970 | Tsumoru et al. ............ 359/359 |
| 4,854,670 A | 8/1989 | Mellor |
| 5,119,232 A | * 6/1992 | Daley et al. ................. 359/359 |
| 5,776,612 A | * 7/1998 | Fisher ......................... 428/426 |

FOREIGN PATENT DOCUMENTS

| DE | 146224 | 4/1979 |
| DE | 3913421 A1 | 4/1989 |
| DE | 3918383 A1 | 6/1989 |
| RU | XP-002187414 | 4/1985 |
| RU | 1675816 A1 | 12/1989 |
| WO | WO94/02972 | 2/1994 |

OTHER PUBLICATIONS

V. Tomaselli et al., "Far–Infrared Bandpass Filters From Cross–Shaped Grids," Applied Optics, Apr. 1981, vol. 20 No. 8; pp. 1361–1366.

* cited by examiner

Primary Examiner—Leonidas Boutsikaris
(74) Attorney, Agent, or Firm—Whitham, Curtis & Christofferson, PC

(57) ABSTRACT

An optical component for effecting frequency selective reflection in the gigahertz and terahertz frequency ranges and for effecting wave permeability includes at least one first layer (1, 3, 5) made of a first material (m1). The first material is optically permeable to electromagnetic radiation of a reference frequency (f) between 5 gigahertz (GHz) and 10 terahertz (THz) and has a first refractive index (n1) and an optical thickness of approximately one-fourth the wavelength (λ) of the electromagnetic radiation of the reference frequency (f) in the first material (m1). There is at least one second layer (2) situated underneath the first layer (1) that is made of a second material (m2) which is optically permeable to electromagnetic radiation of a reference frequency (f) and which has a second refractive index (n2) and an optical thickness of approximately one-fourth or one-half the wavelength (λ) of the electromagnetic radiation of the reference frequency (f) in the second material (2), thus the first refractive index (n1) and the second refractive index (n2) are different.

12 Claims, 1 Drawing Sheet

OPTICAL COMPONENT

The invention relates to an optical component for applications in the gigahertz and terahertz frequency range.

To influence the beam path of electromagnetic waves at frequencies below the infrared band, metal surfaces are currently used which partially absorb and mainly reflect the electromagnetic radiation. In order to selectively filter out electromagnetic radiation in this frequency range, band-pass filters of metal gratings are known which are produced with an appropriate grating constant in each case. Such a band-pass filter is described in "Applied Optics", Volume 20, No. 8 of Apr. 15, 1981, page 1361.

In DE 39 18 383 A1, a facade structure of high buildings is described in which metal foils are applied to the facade spaced apart by one λ/4 wavelength in order to absorb impinging waves and to reduce the reflection. In this arrangement, the interference extinction of the reflected wave component is utilized. The facade is not transparent to waves due to the metal foils.

In DE 39 13 421 A1, an outside wall element for buildings with high reflection loss for radar beams is described. The outside wall element consists of a multiplicity of segments in which the reflected surface is alternately staggered in depth in such a manner that in each case two adjacent surface segments are arranged spaced apart by a distance corresponding to a quarter wavelength of the radar radiation used. The radar waves reflected by the adjacent surface segments differ by half a wavelength in phase from one another due to the staggering of the surface segments in depth so that the reflected waves cancel one another. Disadvantageously, the absorption is not frequency selective.

In DD 146 224, an arrangement for induced absorption of electromagnetic radiation is described in which a number of layers capable of interference composed of individual layers with alternately low refraction and high refraction are provided. However, the arrangement based on a dielectric mirror is only suitable for absorption and not for frequency-selective reflection.

It was the object of the invention to create a flat optical component which reflects frequency-selectively within a frequency range from 5 GHz to 10 THz and is almost transparent for the other frequency ranges. The optical component, at the same time, thus implements frequency-selective filtering in transmission. It should be possible to produce the optical components advantageously inexpensively and with relatively little effort.

According to the invention, this object is achieved by an optical component having at least one first layer of a first material, which is optically transparent for electromagnetic radiation of a reference frequency between 5 gigahertz and 10 terahertz, with a first refractive index, the first layer having an optical thickness of approximately one quarter of the wavelength of the electromagnetic radiation of the reference frequency in the first material. The first layer is applied to a second layer, which is transparent to the electromagnetic radiation of the reference frequency, the second refractive index of which is different from the first refractive index. The optical thickness of the second layer is about ¼ or ½ of the wavelength of the reference frequency.

According to the invention, interference phenomena of the electromagnetic radiation in the gigahertz or terahertz frequency range due to different dielectric characteristics or different refractive indices of two optically transparent materials are thus utilized in order to effect a frequency-selective reflection, for example for shielding rooms. This is of importance to the wireless in-door communication in the GHz and THz range. In the remaining frequency ranges, the optical component is essentially transparent and, in general, a reflection effect also occurs at higher harmonics of the reference frequency.

The optical component makes use of the physical characteristics of the dielectric mirror. Using a dielectric mirror for the frequency-selective shielding of rooms has hitherto not been possible in the conventionally used frequencies within the microwave range since this would require multiple layers of considerable thickness.

The optically transparent materials can advantageously be plastic materials such as polyethylene or polystyrene which can also be produced relatively inexpensively in large surface areas with very accurate and uniform layer thickness. Advantageously, an optically transparent material having low absorption of the reference frequency selected in each case is selected so that the optical component according to the invention provides for as complete reflection or transmission of the radiation of the reference frequency as possible.

The use of interference phenomena in the penetration of electromagnetic radiation through layers with optical thicknesses within the wavelength range of the radiation is already known as such for light within the visible range. In this context, in particular, dielectric mirrors are produced in which layers of different dielectric constant or with different refractive index are arranged alternately above one another and in each case have an optical thickness of a quarter of the wavelength of the reference radiation.

In this arrangement, a constructive interference is obtained for a reflection condition, but a destructive interference is obtained for the transmission condition. Furthermore, the coating of optical components, e.g. optical lenses, is known. Using such coating, it is possible to keep reflection at the interface between air and the optical component low by means of destructive interference of the waves reflected at the interface between the air and the coating layer and the interface between the coating layer and the component.

According to the invention, corresponding interference phenomena are now used for electromagnetic radiation in the gigahertz and terahertz frequency range.

The invention is based on the finding that, for optical components using interference phenomena due to different dielectric properties of the materials used, layer thicknesses lying within the micrometer range up to the range of several 100 micrometers or the millimeter range must be constructed especially in the frequency range between 0.5 gigahertz, but preferably from 5 gigahertz, and 10 terahertz according to the invention. Such layers can also be produced very accurately and very uniformly on a large scale. For this, plastic materials such as, e.g., polyethylene or polystyrene can be used, in particular, which can also be produced with very accurate thickness in this thickness range also for large areas. In particular, when plastic materials are used, different layers with different refractive index, e.g. different plastic materials or plastic materials with different dopings of other components, can be inexpensively joined to one another also for large areas. The layer thicknesses in the micrometer and millimeter range according to the invention only require a small material expenditure even for large-area applications. Furthermore, plastic materials of these thicknesses, in particular, have good mechanical properties, especially high flexibility with respect to mechanical loading even with abrupt mechanical loads.

According to the invention, a dielectric mirror for reflecting required frequency ranges can be advantageously produced. On the one hand, this can be done by a number of alternating layers having in each case an optical thickness of a quarter of the wavelength of the reference radiation, but also by means of other suitable layer sequences.

According to the invention, the dielectric mirror for radiation in the gigahertz and terahertz frequency range can be used, on the one hand, for optical components in devices which emit or receive radiation in this wavelength range.

Furthermore, the dielectric mirror according to the invention can be used over a large area for shielding room units, especially if it is made of thin plastic films. This shielding can be achieved, for example, in that a multilayered optical component is used, e.g. for cladding rooms. This can be done on a wall, for example on wallpaper, or inside the wall, e.g. underneath the wallpaper, between cardboard walls or inside brickwork. Furthermore, windows and glass panes can also be clad with an optical component according to the invention if the materials used are also transparent in the visible frequency range.

According to the invention, cellular areas can be formed by this means in a building, in which a reference radiation in the gigahertz or terahertz frequency range is in each case used for wireless data transmission between different units. The cellular area is advantageously at least largely completely shielded from the outside world for this frequency range. Thus, a number of cellular areas can be formed within a building or a building or a story in a building can be shielded as a whole from the outside world. Compared with shielding by means of e.g. a large-area metal layer, the shielding according to the invention has the advantage that other frequency ranges are not affected and thus a data transmission via the other frequency ranges, e.g. by means of mobile radio, radio, etc. remains unaffected.

Such applications are of interest, in particular, for high data transmissions since the gigahertz and terahertz frequency range used according to the invention provides for higher data transmission rates compared with known data transmissions in the megahertz frequency range. Thus, large data volumes can also be transmitted rapidly for which parallel interfaces are conventionally used such as, e.g., a wireless data transmission from a computer to a printer.

In the building walls, a number of optical components with reference frequencies which are slightly displaced with respect to one another can also be formed advantageously. The desired effects of a reflection or transmission ideally only occur with a precisely perpendicular incidence, whereas sufficiently good reflections are still achieved with a slightly oblique incidence. With a shallow incidence, however, relatively large radiation intensities may penetrate through the optical component. According to the invention, the second optical component makes it possible to selectively reflect radiation incident on the wall at a shallow angle so that, overall, radiation can be reflected from any spatial direction.

In the text which follows, the invention will be explained by means of a number of embodiments and referring to the attached drawings, in which.

Figure 1:
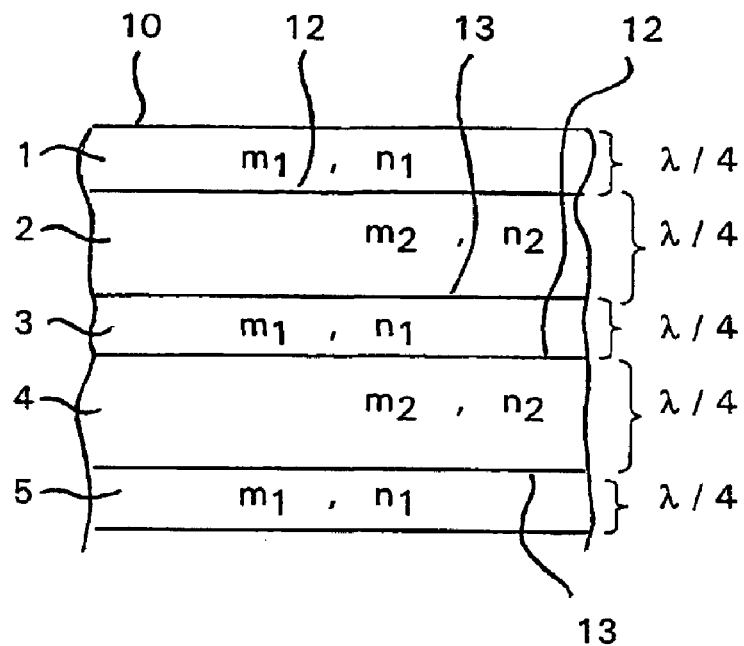
FIG. 1 shows a section through an optical component for reflection applications according to a first embodiment of the invention.

FIG. 1 shows a dielectric multilayer mirror in which first layers 1, 3, 5 of a first material m1 with a first refractive index n1 alternate with second layers 2, 4 of a second material m2 with a second refractive index n2. In particular, this material can be a plastic, e.g. polyethylene or polystyrene. In this arrangement, n1 is greater than n2. The layers 1 to 5 in each case have an optical thickness of a quarter of the wavelength $\lambda$ of a reference radiation in the frequency range from 5 GHz to 10 THz. Suitable reference frequencies are located, in particular, within the range from 50 gigahertz to 2 terahertz. Due to the different refractive indices and thus the different wavelength of the reference radiation in the respective medium, the first layers 1, 3, 5 are thinner than the second, optically thinner layers 2 and 4. For a vertically incident radiation, a frequency shift of half the wavelength is obtained with an incidence of the reference radiation at a first interface 10 between air and the first layer due to a reflection on an optically denser medium for the reflected radiation. At the interfaces 12 of the optically denser first layer and an optically thinner second layer, a reflection without phase shift is obtained. With a reflection from an interface 13 of an optically thinner second layer on an optically thicker first layer, a reflection with a phase shift of half the wavelength is again obtained.

Since all the layers have an optical thickness of one quarter of a suitable reference frequency, radiation of the reference frequency is almost completely reflected with a perpendicular incidence. In this embodiment, the last layer 5 can be advantageously a first layer of the optically thicker medium.

Figure 2:
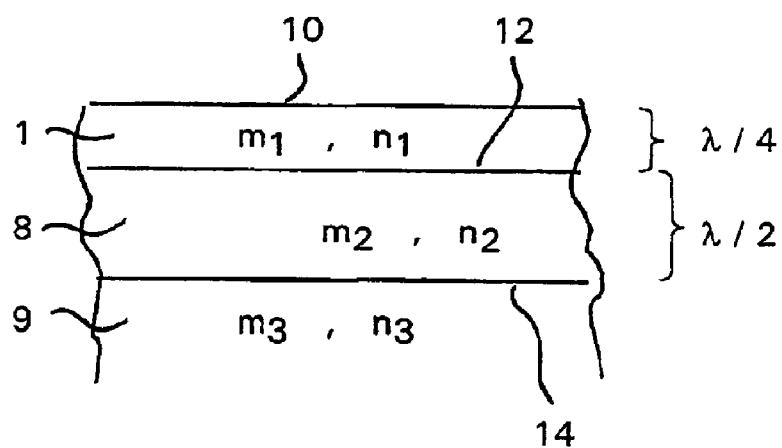
FIG. 2 shows a section through an optical component for reflection applications according to a second embodiment of the invention.

FIG. 2 shows a further embodiment of a dielectric mirror in which an optically dense first layer 1 of a first material m1 with a first refractive index n1 is followed by an optically thinner second layer 8 of a second material m2 with a second refractive index n2. Underneath the second layer 8, a sub area 9 of a third material with an optically thinner material m3 is formed. n1 is thus greater than n2 which is greater than n3. In this embodiment, the first layer 1 again has a thickness of a quarter of the wavelength of a reference radiation, the second layer 8 has a thickness of half the wavelength of the reference radiation. This can be followed by a sub area 9 of arbitrary size.

In this embodiment, the reference radiation is reflected away so that only other frequency ranges can enter into the optically transparent base 9. In this arrangement, a reflection takes place at an optically thinner medium at the interface 14, in addition to the reflections at the interfaces 10 and 12 which correspond to those of FIG. 1, as a result of which a wave is reflected back with a phase shift of half the wavelength. On passing through the second layer 8, this wave reflected back experiences a phase shift of $\lambda$ compared with the wave reflected on the interface 12 so that the waves reflected at the interfaces 12 and 14 and the waves reflected on the interface 10 are constructively superimposed.

What is claimed is:

1. An optical component for frequency-selective reflection in the gigahertz and terahertz frequency range and wave transparency, comprising:

at least one first layer (1, 3, 5) of a first material (m1), which is optically transparent for electromagnetic radiation of a reference frequency (f) between 5 gigahertz (GHz) and 2 terahertz (THz), with a first refractive index (n1) and an optical thickness of approximately one quarter of the wavelength ($\lambda$) of the electromagnetic radiation of the reference frequency (f) in the first material (m1), underneath the first layer (1), at least one second layer (2) of a second material (m2), which is optically transparent for the electromagnetic radiation of the frequency (f), with a second refractive index (n2) and an optical thickness of approximately one quarter or half of the wavelength (λ) of the electromagnetic radiation of the reference frequency (f) in the second material (m2), the first refractive index (n1) and the second refractive index (n2) being different.

2. The optical component as claimed in claim 1, wherein either or both the first and second material (m1, m2) is a plastic material.

3. The optical element as claimed in claim 1, wherein the second refractive index is greater than the first refractive index and the optical component is constructed as an antenna, a radiation conductor, lens or prism or beam divider.

4. The optical component as claimed in claim 1, wherein the first refractive index is greater than the second refractive index.

5. The optical component as claimed in claim 4, wherein a number of first layers (1, 3, 5) and second layers (2, 4) are provided alternately above one another.

6. The optical component as claimed in claim 4, wherein an odd number of layers is provided and a layer (1) and a bottom layer (5) are first layers.

7. An optical component for frequency-selective reflection in the gigahertz and terahertz frequency range and wave transparency, comprising:

at least one first layer (1, 3, 5) of a first material (m1), which is optically transparent for electromagnetic radiation of a reference frequency (f) between 5 gigahertz (GHz) and 2 terahertz (THz), with a first refractive index (n1) and an optical thickness of approximately one quarter of the wavelength (λ) of the electromagnetic radiation of the reference frequency (f) in the first material (m1), underneath the first layer (1), at least one second layer (2) of a second material (m2), which is optically transparent for the electromagnetic radiation of the frequency (f), with a second refractive index (n2), wherein the second layer has a second thickness of approximately half of the wavelength of the electromagnetic radiation of the reference frequency, and underneath the second layer, a sub area of a third material which is optically transparent for the electromagnetic radiation of the reference frequency, with a third refractive index is constructed, and the first refractive index is greater than the second refractive index and the second refractive index is greater than the third refractive index.

8. A building wall in which at least one optical component as claimed in claim 4 is provided in at least one large area of an outside surface or an inside section of the building wall.

9. The building wall as claimed in claim 8, having two or more optical components characterized in that the first refractive index is greater than the second refractive index, which have reference frequencies which are different from one another and are preferably close to one another, and which are arranged above one another in the direction of the wall thickness.

10. A building with inside walls and outside walls in which some of the outside walls and preferably some of the inside walls are constructed as building wall as claimed in claim 8.

11. The optical component of claim 2 wherein said plastic material is selected from the group consisting of polyethylene and polystyrene.

12. The optical component of claim 1 wherein the reference frequency (f) is located within the range from 50 GHz to 2 THz.

* * * * *